(12) United States Patent
Shibuya

(10) Patent No.: US 6,809,257 B2
(45) Date of Patent: Oct. 26, 2004

(54) CAPPED CLIP FOR PIPE, ELECTRIC CABLE OR THE LIKE

(75) Inventor: Tomio Shibuya, Toyohashi (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/481,724

(22) PCT Filed: Jun. 20, 2002

(86) PCT No.: PCT/US02/19552

§ 371 (c)(1),
(2), (4) Date: Dec. 22, 2003

(87) PCT Pub. No.: WO03/001069

PCT Pub. Date: Jan. 3, 2003

(65) Prior Publication Data

US 2004/0159454 A1 Aug. 19, 2004

(30) Foreign Application Priority Data

Jun. 22, 2001 (JP) ........................................ 2001/190150

(51) Int. Cl.$^7$ ................................................. H02G 3/10
(52) U.S. Cl. ........................ 174/49; 174/72 A; 174/135; 248/71
(58) Field of Search ................................ 174/72 A, 49, 174/135, 72 R, 40 CC; 248/73, 71; 24/487

(56) References Cited

U.S. PATENT DOCUMENTS

| | | | | |
|---|---|---|---|---|
| 3,954,238 A | * | 5/1976 | Nivet | 248/68.1 |
| 4,478,381 A | | 10/1984 | Pittion et al. | |
| 5,209,441 A | * | 5/1993 | Satoh | 248/74.2 |
| 5,820,048 A | * | 10/1998 | Shereyk et al. | 248/68.1 |
| 6,380,483 B1 | * | 4/2002 | Blake | 174/65 R |
| 6,641,093 B2 | * | 11/2003 | Coudrais | 248/73 |

FOREIGN PATENT DOCUMENTS

| | | |
|---|---|---|
| DE | 199 39 081 C | 10/2000 |
| EP | 0 736 713 A | 10/1996 |
| EP | 0 933 575 A | 8/1999 |
| JP | 10 259884 A | 9/1998 |

OTHER PUBLICATIONS

International Search Report for PCT/US02/19552; ISA/ EPO; Mailed; Oct. 16, 2002.

* cited by examiner

*Primary Examiner*—Dhiru R Patel
(74) *Attorney, Agent, or Firm*—Harness, Dickey & Pierce, P.L.C.

(57) ABSTRACT

A capped clip 1 integrally includes a fixing portion 5 to be fixed to a workpiece, a clamp portion 10 having a pair of clamp arms 7, 9 standing from the fixing portion in a U-shape to hold a pipe or the like, and a cap portion 13 for closing an opening 11 of the clamp portion. The capped clip 1 further includes a thin hinge 17 connecting the cap portion to the outer surface of a first one of the clamp arms to allow the cap portion to be pivotally moved thereabout a protrusion 26 protruding outward from said first clamp arm 71 a recess 27 formed in the cap portion to receive the protrusion therein when the cap portion is pivotally moved to its closed position, an engagement shoulder 30 formed in the recess 27 to engage with the protrusion, and a pair of walls 31 defining a portion of the recess 27 to be located on the opposite sides of the protrusion when the cap portion is in its closed position to prevent the protrusion from coming out of the recess.

4 Claims, 5 Drawing Sheets

CAPPED CLIP FOR PIPE, ELECTRIC CABLE OR THE LIKE

FIELD OF THE INVENTION

The present invention relates to a clip for fixing an elongated member, such as a pipe, electric cable or the like used in an automobile, electric equipment, consumer electric appliance, industrial machine or the like, to an automobile body, or another workpiece. In particular, the present invention relates to a capped clip or a clip having a cap for fixing an elongate member, such as a pipe, electric cable or the like, to a workpiece.

BACKGROUND OF THE INVENTION

A capped clip for fixing an elongate member, such as a pipe, electric cable or the like, to a workpiece such as an automobile body is known. Some examples of such capped clips are disclosed in Japanese Patent Laid-Open No. 51-070489, Japanese Utility Model Laid-Open No. 58-186277 and Japanese Utility Model Laid-Open No. 63-077184. The clip of the Japanese Patent Laid-Open No. 51-070489 comprises a pair of semicircular members; one serves as a fixing portion to be fixed to a workpiece, and the other serves as a cap portion. These semicircular members are connected with each other through a hinge, and the cap member is pivoted about the hinge to be closed to hold a cable therein. This clip can advantageously hold the cable simply by pivoting the cap member about the hinge. However, when a certain force is applied to the closed cap member in the direction causing pulling out of the cable, the cap member could be undesirably deformed to come out of an engagement portion. The capped clip of the Japanese Utility Model Laid-Open No. 58-186277 includes a cap member capable of pivoting about a shaft of a fixing member, and the cap member and the fixing member are formed separately as two components. Thus, as compared to an integrally molded structure as a one-piece component, this clip needs a larger number of molding dies and man-hours for its molding and assembling processes. In the clip of the Japanese Utility Model Laid-Open No. 63-077184, a fixing portion and a cap portion are integrally formed with each other. However, the clip is constructed to fix one of the ends of the cap portion by a pivot when the cap portion is in its closed position. This can cause excessive play in the pivot portion, resulting in unstable movement of clips held in the clip.

In addition to the capped clips described above, Japanese Utility Model Laid-Open No. 55-120873, Japanese Design Registration No. 595528 and Japanese Patent Laid-pen No. 10-030750 disclose other capped clips. These clips are integrally molded in a one-piece, and each of the clips includes a fixing portion to be fixed to a workpiece, a clamp portion having a pair of clamp arms standing from the fixing portion in an approximate U-shape to define a U-shaped holding section for holding an elongated member such as a pipe, electric cable or the like, and a cap portion for closing an opening of the clamp portion. These capped clips are adapted to hold the elongated member by inserting the elongated member from the opening of the clamp portion and then closing the opening with the cap portion. In these clips, the cap portion and the clamp portion are integrally formed to connect with each other through a hinge. Further, additional engagement portions other than the hinge are formed in both the cap portion and the fixing portion at a position adjacent to the hinge, so that, after the cap portion is pivoted about the hinge to fix the cap portion in its closed position, the cap portion is firmly fixed in the closed position. In these clips, if the electric cable or pipe held in the clamp portion is moved in the longitudinal direction of the electric cable or pipe relative to the clamp portion, the cap portion in frictional contact with the clamp portion can be moved relative to the clamp portion in the longitudinal direction. When the movement distance goes over a certain limit, the engagement portion of the cap portion adjacent to the hinge can be released from the corresponding engagement portion of the clamped portion, and consequently the electric cable or pipe will undesirably come out of the clip.

Further, Japanese Patent Laid-Open No. 10-259884 discloses a capped clip including a fixing portion to be fixed to a workpiece, a semicircular damp portion for holding an elongated member such as a pipe, electric cable or the like, and a semicircular cap portion for closing an opening of the clamp portion with the clip being integrally molded in a one-piece component. This capped clip is adapted to hold the elongated member by inserting the elongated member from the opening of the clamp portion and then closing the opening with the cap portion. In this capped clip, one of the sides of the cap portion is connected to one of the sides of the clamp portion through a thin hinge allowing the cap portion to be pivoted to close the opening of the damp portion. The other side of the cap portion is formed with a first engagement portion adapted to engage with a second engagement portion formed in the other side of the clamp portion, so as to keep the cap portion in its held position. Further, a protrusion is formed on the outer surface of the clamp portion adjacently to the hinge, and the cap portion is formed with a recess for receiving the protrusion therein when the cap portion is closed, to allow the cap portion to be firmly fixed in its closed position. This clip is formed with step portions allowing the cap portion in frictional contact with the clamp portion to be constrained by the clamp portion when the electric cable or pipe held in the clamp portion is moved in the longitudinal direction of the electric cable or pipe relative to the clamp portion, so that the cap portion is not moved in the longitudinal direction. However, these step portions are provided at two positions apart from each other along the circumferential direction of the semicircular clamp portion and the semicircular cap portion, resulting in complicated configuration and increased cost of molding dies therefor.

It is therefore an object of the present invention to provide a capped clip for a pipe, electric cable or the like, capable of keeping a cap portion of the clip in its closed position and allowing the cap portion to be constrained by a clamp portion of the clip even if an electric cable or pipe held in the clamp portion is moved in the longitudinal direction of the electric cable or pipe relative to the clamp portion, so that the cap portion is not moved in the longitudinal direction to keep the closed position, with simplifying the configuration of a molding die therefor.

SUMMARY OF THE INVENTION

In order to achieve the above object, according to the present invention, there is provided a capped clip for a pipe, electric cable or the like, comprising a fixing portion to be fixed to a workpiece, a damp portion having a pair of clamp arms standing from the fixing portion in an approximate U-shape to define a U-shaped holding section for holding an elongated member such as a pipe, electric cable or the like, and a cap portion for dosing an opening of the clamp portion with the fixing, clamp and cap potions being integrally molded to form one piece, wherein the capped clip is adapted to hold the elongated member by inserting the elongated member into the opening of the clamp portion and then closing the opening with the cap portion. The capped clip according to the present invention further comprises: a thin hinge connecting the cap portion to the outer surface of a first one of the clamp arms to allow the cap portion to be pivotally moved about the hinge to close the opening of the clamp portion; a first engagement portion formed in the cap portion and adapted to engage with a second engagement portion formed in a second one of the clamp arms to keep the cap portion in its closed position; a protrusion formed at the opening-side end of the first clamp arm having the thin hinge, the protrusion protruding outward from the holding section; a recess formed in the cap portion at a position corresponding to the protrusion of the first clamp arm, the recess being adapted to receive the protrusion therein when the cap portion is pivotally moved to its closed position; an engagement shoulder formed in the recess and adapted to engage with the protrusion to lock the cap portion in its closed position when the cap portion is in the closed position; and a pair of walls defining a portion of the recess to be located on the opposite sides of the protrusion in the longitudinal direction of the elongated member, the walls being adapted to confine the protrusion to prevent it from coming out of the recess even if the cap portion is forced to move with respect to the clamp portion in either longitudinal direction of the elongated member received in the holding section when the cap portion is in its closed position.

By virtue of the above structure, when the recess receives the protrusion of the arm of the clamp portion, the engagement shoulder engages with the protrusion to keep the cap portion in its closed position reliably. Further, the opposite walls constrain the relative movement between the protrusion and the recess so that the cap portion is not move with respect to the clamp portion in the longitudinal direction so as to keep the closed position. Furthermore, since both the engagement shoulder and the walls are defined only in the recess, a molding die therefor can be simplified in configuration and reduced in cost.

In the capped clip described above, the protrusion of the first clamp arm may have a certain thickness in the height direction of the U-shaped clamp portion, and the recess of the cap portion may have a height equal to or slightly smaller than the thickness of the protrusion. Even if the protrusion has a slightly smaller thickness than that of the recess, the recess can receive the protrusion therein due to leverage of the cap potion when the cap portion is pivoted about the hinge to be closed. This allows the protrusion to be fitted into the recess without any loosening. Thus, the cap portion is more reliably kept in its closed position without any undesirable movement. Further, the engagement shoulder of the cap portion may be formed to be brought into surface contact with the protrusion when the cap portion is in its closed position. This allows the cap portion to be more firmly kept in its closed position. Furthermore, the recess of the cap portion may be formed as a hole which is hollowed from the outside of the cap portion to allow the protrusion to be received and to provide both the engagement shoulder and the walls therein. The hole may be in communication with an opening formed in the cap portion on the inside thereof to allow the protrusion to be inserted therethrough during the pivotal movement of the cap portion. This allows the recess to be formed as intended by using a simplified molding die.

DETAILED DESCRIPTION OF THE PREFERRED EMBODIMENT

Figure 1:
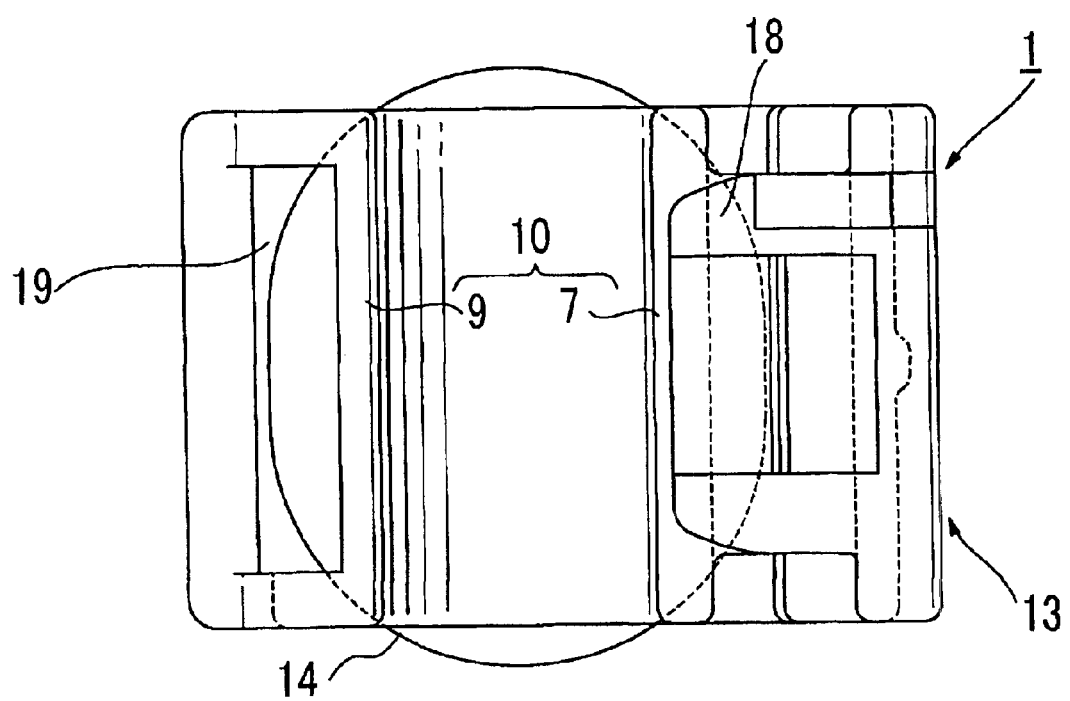
FIG. 1 is a top plan view of a clip according to the present invention when a cap portion of the clip is in its open position.
Figure 2:
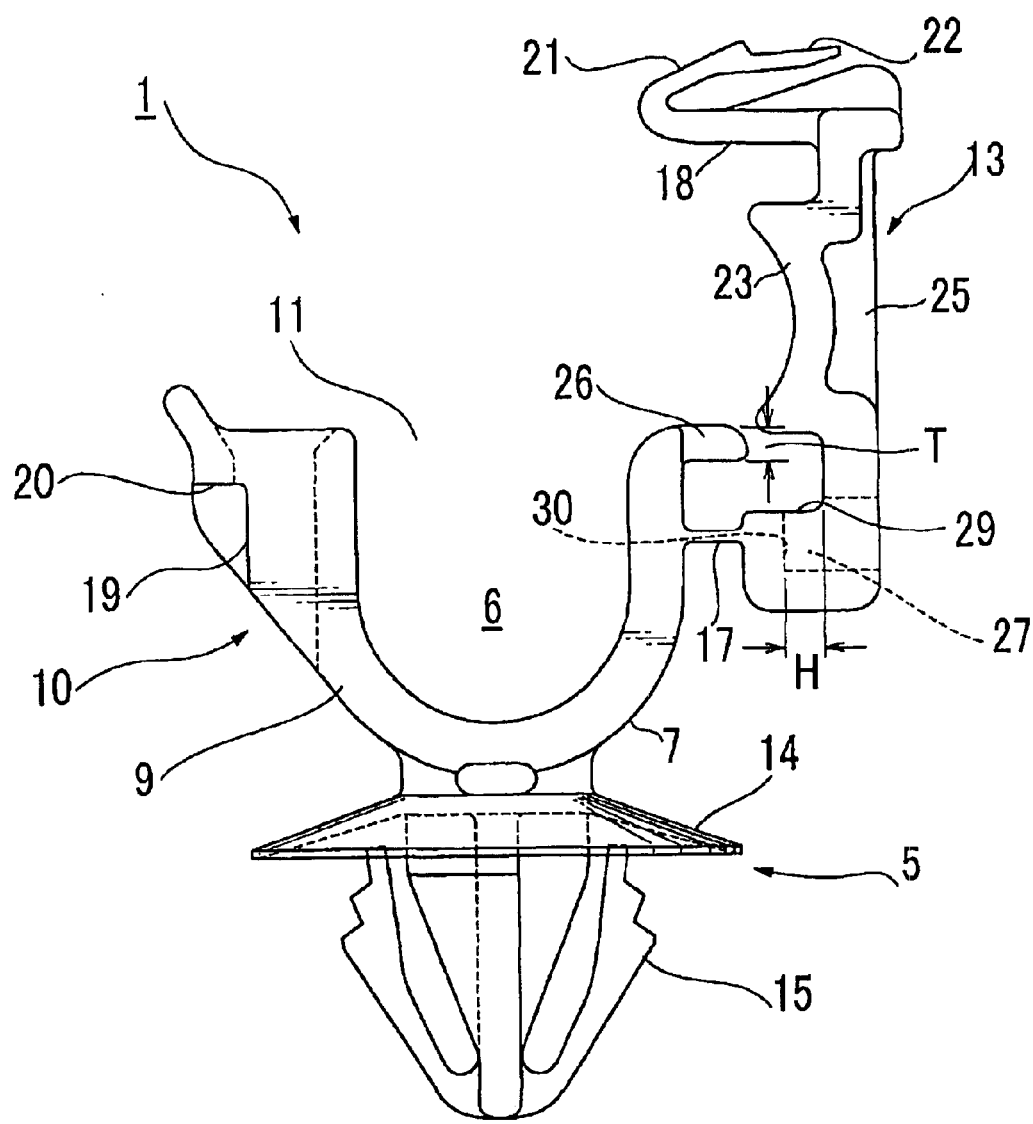
FIG. 2 is a front view of the clip in FIG. 1.
Figure 3:
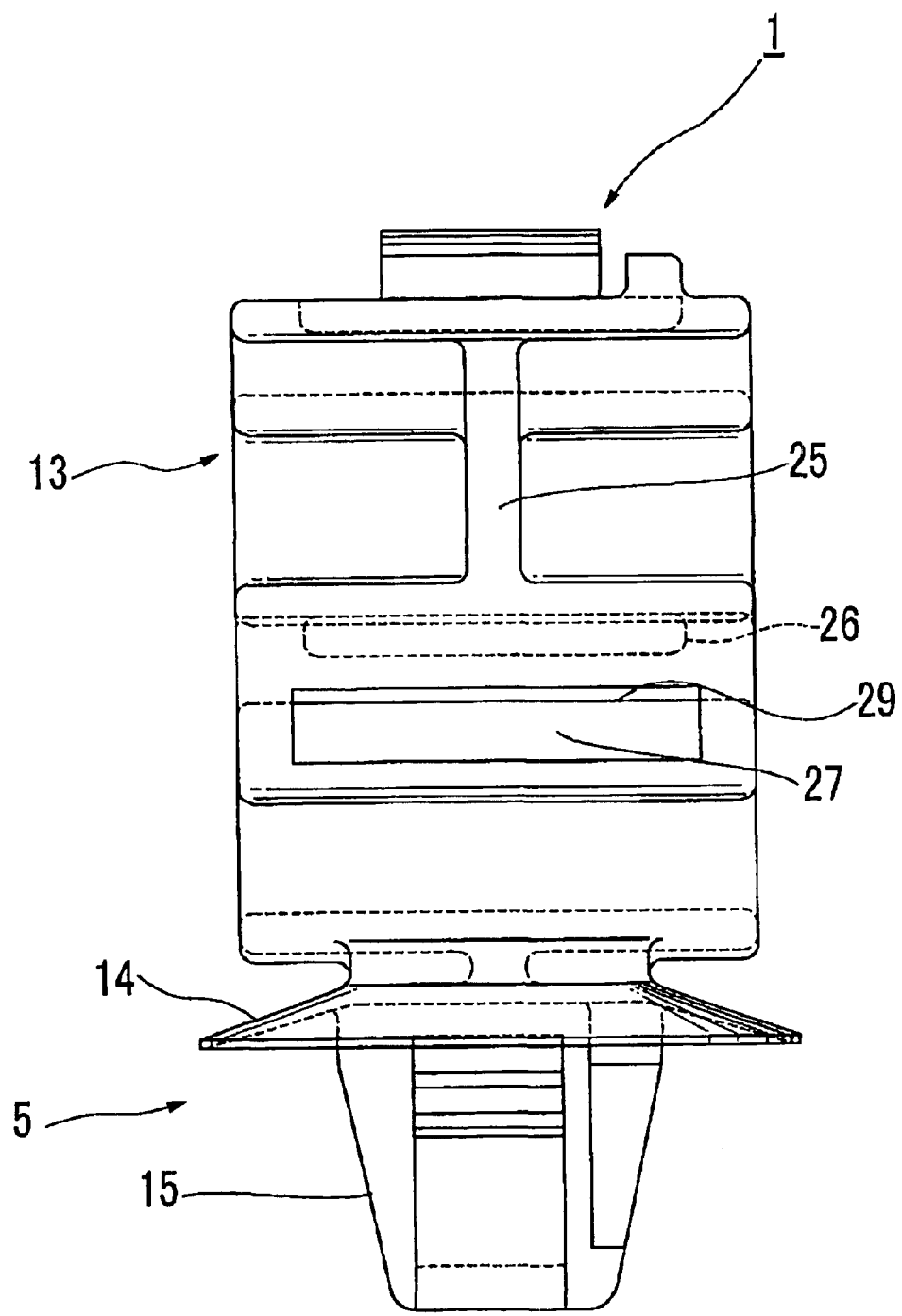
FIG. 3 is a right side view of the clip in FIG. 1.
Figure 4:
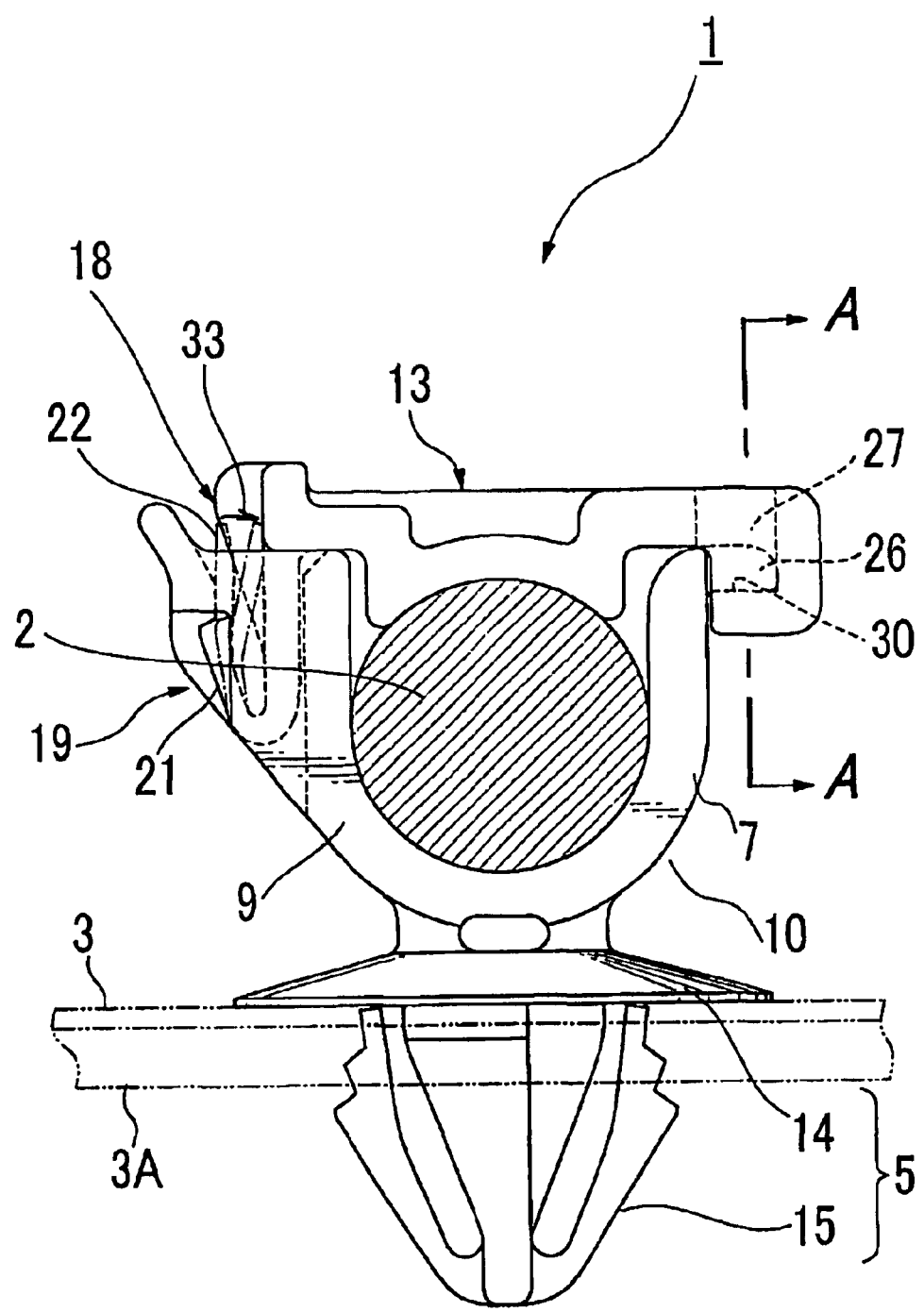
FIG. 4 is a front view of the clip that by using the clip in FIG. 1, a pipe is fixed to an automobile body or the like and the cap portion is closed.
Figure 5:
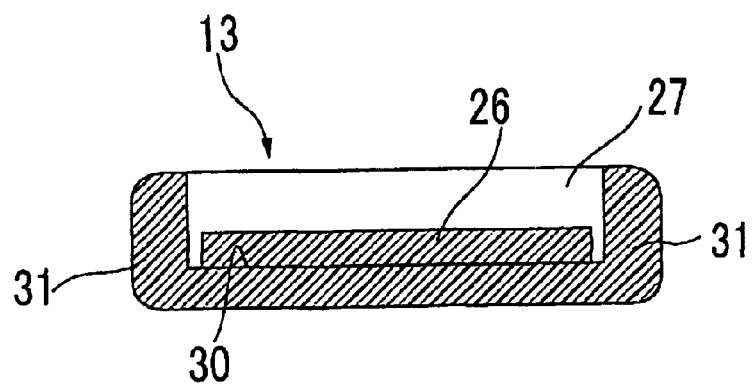
FIG. 5 is a sectional view of the clip taken along the line A—A of FIG. 4.
Figure 6:
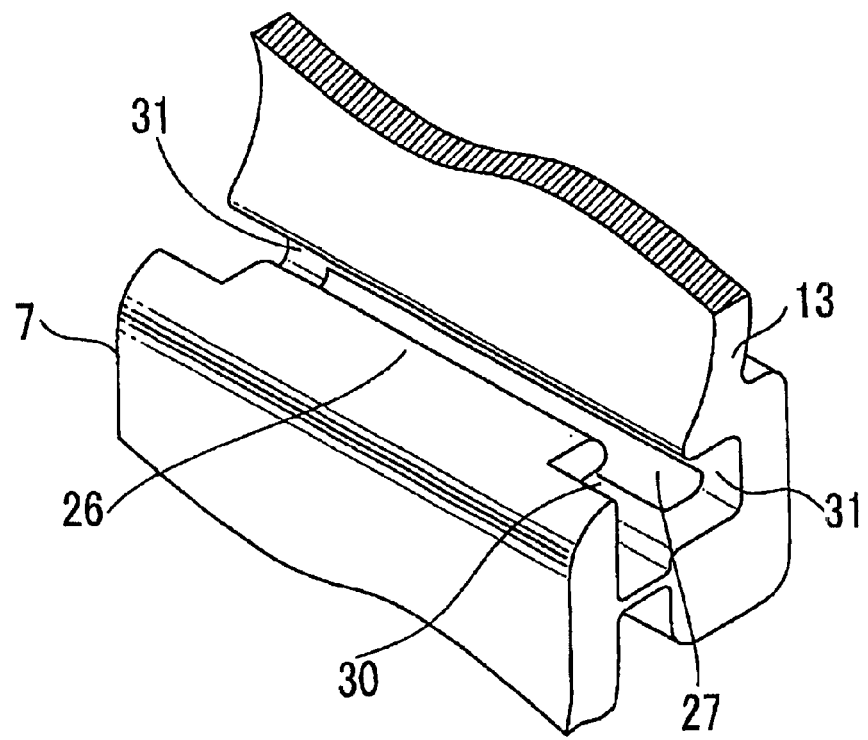
FIG. 6 is a perspective view showing the relationship between a recess portion of the cap portion and a protrusion of a clamp portion in the clip of FIG. 1.

With reference to the drawings, a capped clip according to the present invention will be described. FIGS. 1 to 3 are a top plan view, front view, and right side view showing a capped clip 1 before a cap portion of the dip is closed, respectively. FIG. 4 is a front view of the capped clip 1 under the condition that a pipe 2 as an elongated member is fixed to a workpiece such as an automobile body 3 (and additional panel 3A) by using the capped clip 1. FIG. 5 is a sectional view of the clip 1 taken along the line A—A of FIG. 4. FIG. 6 illustrates the relationship between a recess portion of the cap portion and a protrusion of a clamp portion in the capped dip 1 before the cap portion is dosed.

The capped clip 1 according to the present invention is an integrally molded component of plastic material. Referring to FIGS. 1 to 3, the capped clip 1 includes a fixing portion 5 to be fixed to a workpiece (automobile body 3 or the like), a clamp portion 10 having a pair of clamp arms 7, 9 standing from the fixing portion 5 in an approximate U-shape to define a U-shaped holding section 6 for holding an elongated member such as a pipe 2, and a cap portion 13 for closing an opening 11 of the clamp portion 10. Based on this structure, the clip holds the elongated member such as a pipe or an electric cable by inserting the elongated member into the opening 11 of the clamp portion 10 and then closing the opening 11 with the cap portion 13. As can be seen in FIGS. 1 to 3, in order to hold the elongate member such as a pipe, each of the cap portion 13 and the clamp portion 14 is formed to have a certain length in the longitudinal direction of the pipe or the like held therein. In the illustrated embodiment, the fixing portion 5 comprises a flange 14 and an anchor leg to be inserted into a mounting hole formed in the automobile body 3 (and the panel 3A) as the workpiece and attached to the automobile body 3. The fixing portion 5 may be formed in any other suitable configuration allowing the fixing portion to be fixed to an intended workpiece. For example, when a stud is fixedly provided on the workpiece, the fixing portion 5 will be formed as a stud engagement portion to be fixed to the stud. In that case, if the stud is a T-stud or a stud bolt, the fixing portion is variously formed in a configuration in conformity therewith.

The cap portion 13 is connected with the outer surface of the first one 7 of the clamp arms of the clamp portion 10 through a thin hinge 17. The hinge 17 allows the cap portion 13 to be pivotally moved to close the opening 11 of the clamp portion 11. A cap engagement portion 18 is formed in the cap portion 13 on the opposite side to the hinge 17. Further, a clamp engagement portion 19 is formed in the second one 9 of the clamp arms to receive the cap engagement portion 18 therein and engage with the cap engagement portion 18. In the illustrated embodiment, the clamp engagement portion 19 is formed as a receiving hole for receiving the cap engagement portion and is formed with an engagement shoulder 20 adapted to engage with the cap engagement portion fitted into the receiving hole. The cap engagement portion 18 is formed as an flexible or resilient engagement pawl 21 to be inserted into the clamp engagement portion 19. Thus, when inserted into the clamp engagement portion 19, the flexible engagement pawl 21 engages with the clamp engagement portion 19 to keep the cap portion 13 in its closed position. The flexible engagement pawl 21 of the cap engagement portion 18 is provided with a release lever 22 which can be pushed with a finger, a screwdriver or the like to release the above engagement. The inside surface of the cap portion 13 is formed with a pressing portion 23 having a configuration for pressing and holding the pipe 2 or the like received in the holding section 6 of the clamp portion 10. A reinforcing rib is provided on the outer surface of the cap portion 13 to maintain the rigidity of the cap portion 13 in high level.

As shown in FIG. 2, a protrusion 26 is formed at the upper end of the opening 11 and the side of the first clamp arm 7 having the thin hinge 17. The protrusion 26 protrudes outward from the U-shaped holding section 6. As shown by the broken line of FIG. 3, the distance between the right and left sides of the protrusion 26 is made shorter than the width of the cap portion 13. Further, a recess 27 is formed in the cap portion 13 at a position corresponding to the protrusion 26. The recess 27 can receive the protrusion 26 therein when the cap portion 13 is pivotally moved to its closed position. The recess 27 can be formed as a hole which is hollowed from the outside of the cap portion 13 to allow the protrusion 26 to be received therein. Thus, a molding die therefor can be simplified in configuration, and a simple split die set can be used. The hollowed hole is in communication with an opening 29 (see FIGS. 2 and 3) formed in the cap portion on the inside thereof to allow the protrusion 26 to be inserted therethrough during the pivotal movement of the cap portion 13, so as to provide the recess 27. FIG. 6 shows the relationship between the protrusion 26 and the recess 27 in detail. The recess 27 is formed with an engagement shoulder 30 adapted to engage with the protrusion 26 to lock the cap portion 13 in its closed position when the cap portion 13 is in the closed position. The engagement shoulder 30 is formed to be brought into surface contact with the under surface of the protrusion 26 when the cap portion 13 is in its closed position. Further, a pair of walls 31 are provided to define a portion of the recess 27 to be located on the opposite sides of the protrusion in the longitudinal of the elongated member such as the pipe 2 held in the holding section 6 when the cap portion 13 is in its closed position. The walls 31 are formed to prevent the protrusion 26 from coming out of the recess 27 even if the cap portion 13 is forced to move in either the above longitudinal direction relative to the clamp portion 10 when the cap portion 13 is in its closed position. These walls 31, 31 are also shown in FIG. 5 which is a sectional view of the clip 1 taken along the line A—A of FIG. 4 under the condition that the pipe 2 is fixed to the automobile body 3 (and the additional panel 3A) by using the capped clip 1.

FIG. 4 shows that the pipe 2 as an elongated member is fixed to the automobile body 3 (and the additional panel 3A) as a workpiece by using the capped clip 1 having the aforementioned structure. The clip 1 is fixed to the automobile body 3 or the like by inserting the fixing portion 5 into each mounting hole of the automobile body 3 and the additional panel 3A. The pipe 2 is received in the U-shaped holding section of the clamp portion 10. The cap portion 12 is pivotally moved about the hinge 17, and the cap engagement portion 18 engages with the damp engagement portion 19 to keep the cap portion in its closed position. In the course of the pivotal movement of the cap portion 13, the recess 27 receives the protrusion 26 of the clamp arm 7 and brings the under surface of the protrusion 26 into surface contact with the engagement shoulder 30 of the recess 27. This allows the cap portion to be reliably kept in its closed position without any contribution of the hinge 17. In this manner, after the protrusion 26 is retained by the recess 27 through the pivotal movement of the cap portion 13, the thin hinge 17 will be exonerated from the responsibility for keeping the cap portion 13 in its closed position, and thereby any problem will be not caused even if the thin hinge 17 is broken.

As shown in FIG. 2, the protrusion 26 has a certain thickness T in the height direction of the clamp portion 10. Correspondingly, the recess 27 of the cap portion preferably has a height H equal to or slightly smaller than the thickness T of the protrusion 26. Even if the thickness T of the protrusion 26 is slightly larger than the height H of the recess, the cap potion 13 can insert the protrusion 26 into the recess 27 by virtue of leverage of the cap portion arising when the cap portion 13 is pivotally moved about the hinge 27 to its closed position. This allows the protrusion 26 to be fitted into the recess 27 without any loosening. Thus, the cap portion is more reliably kept in its closed position without any undesirable movement.

Further, in the recess 27 to receive the protrusion 26 of the clamp portion 10, the opposite walls 31, 31 confine the protrusion 26 to prevents it from moving in the longitudinal direction of the pipe. Thus, even i the pipe 2 is moved in the longitudinal direction thereof and consequently the cap portion 13 is frictionally forced to move in the same longitudinal direction, the cap portion 13 is constrained by the clamp portion 10 so as not to move in the longitudinal direction. This condition is shown in FIG. 5. In FIG. 5, the protrusion 26 is fixed, and thereby even if the cap portion 13 is forced to move rightward or leftward, this movement is blocked by the left-side or right-side wall 31. Thus, the cap potion 13 can keep its closed position and prevent the pipe 2 from coming out. For detaching the pipe 2, the cap engagement portion 18 is released from the clamp engagement portion 19 by turning the release lever 22 in a direction shown by an arrow 33 in FIG. 4, and then the cap portion 13 can be pivotally moved to its open position.

According to the capped clip of the present invention, when the recess receives the protrusion of the arm of the clamp portion, the engagement shoulder engages with the protrusion to keep the cap portion in its closed position reliably. Further, the walls located on the opposite sides of the protrusion constrain the relative movement between the protrusion and the recess. Thus, the cap portion is not move relative to the clamp portion in the longitudinal direction so as to keep the dosed position. Furthermore, since both the engagement shoulder and the walls are defined only in the recess, a molding die therefor can be simplified in configuration and reduced in cost.

I claim:

1. A capped clip for a pipe, electric cable or the like, comprising a fixing portion to be fixed to a workplace, a clamp portion having a pair of clamp arms standing from said fixing portion in an approximate U-shape to define a U-shaped holding section for holding an elongated member such as a pipe, electric cable or the like, and a cap portion for closing an opening of said clamp portion with said fixing portion, clamp and cap potions being integrally molded to form one piece, wherein said capped clip is adapted to hold said elongated member by inserting said elongated member into the opening of said clamp portion and then closing said opening with said cap portion, said capped clip further comprising:

a thin hinge connecting said cap portion to the outer surface of a first one of said clamp arms to allow said cap portion to be pivotally moved about said hinge to close the opening of said clamp portion;

a first engagement portion formed in said cap portion and adapted to engage with a second engagement portion formed in a second one of said clamp arms to keep said cap portion in its closed position;

a protrusion formed at the opening-side end of said first clamp arm having said thin hinge, said protrusion protruding outward from said holding section;

a recess formed in said cap portion at a position corresponding to said protrusion of said first clamp arm, said recess being adapted to receive said protrusion therein when said cap portion is pivotally moved to its closed position;

an engagement shoulder formed in said recess and adapted to engage with said protrusion to lock said cap portion in its closed position when said cap portion is in said closed position; and a pair of walls defining a portion of said recess to be located on the opposite sides of said protrusion in the longitudinal direction of the elongated member, said walls being adapted to confine said protrusion to prevent it from coming out of said recess even i said cap portion is forced to move with respect to said clamp portion in either longitudinal direction of said elongated member received in said holding section when said cap portion is in its closed position.

2. A capped clip as defined in claim 1, wherein said protrusion of said first clamp arm has a thickness in the height direction of said U-shaped clamp portion, and said recess of said cap portion has a height equal to or slightly smaller than said thickness of said protrusion.

3. A capped clip as defined in claim 1, wherein said engagement shoulder of said cap portion is formed to be brought into surface contact with said protrusion when said cap portion is in its closed position.

4. A capped clip as defined in claim 1, wherein said recess of said cap portion is formed as a hole which is hollowed from the outside of said cap portion to allow said protrusion to be received and to provide both said engagement shoulder and said walls therein, said hole being in communication with an opening formed in said cap portion on the inside thereof to allow said protrusion to be inserted therethrough during the pivotal movement of said cap portion.

* * * * *

UNITED STATES PATENT AND TRADEMARK OFFICE
CERTIFICATE OF CORRECTION

PATENT NO. : 6,809,257 B2  Page 1 of 1
DATED : October 26, 2004
INVENTOR(S) : Shibuya It is certified that error appears in the above-identified patent and that said Letters Patent is hereby corrected as shown below:

Column 6,
Line 56, "workplace" should be -- workpiece --.

Column 8,
Line 1, "i" should be -- if --.

Signed and Sealed this

First Day of February, 2005

JON W. DUDAS
*Director of the United States Patent and Trademark Office*